(12) United States Patent
Kreider et al.

(10) Patent No.: US 8,346,538 B2
(45) Date of Patent: Jan. 1, 2013

(54) METHODS AND SYSTEMS FOR REDUCING ANGULAR VELOCITY USING A GYROSCOPE ARRAY

(75) Inventors: Thom Kreider, Peoria, AZ (US); Brian Underhill, Phoenix, AZ (US); Brian Hamilton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 410 days.

(21) Appl. No.: 12/787,189

(22) Filed: May 25, 2010

(65) Prior Publication Data

US 2011/0295449 A1 Dec. 1, 2011

(51) Int. Cl.
*G01C 19/00* (2006.01)
*G01C 23/00* (2006.01)
(52) U.S. Cl. ......................... 704/4; 73/504.02
(58) Field of Classification Search .................. 701/3–4, 701/500; 73/504.02, 504.17; 74/5; 356/459, 356/475–476
See application file for complete search history.

(56) References Cited

U.S. PATENT DOCUMENTS

| | | | | |
|---|---|---|---|---|
| 4,801,206 A | * | 1/1989 | Benoist | 356/459 |
| 4,844,615 A | * | 7/1989 | Benoist | 356/475 |
| 6,917,862 B2 | | 7/2005 | Wie | |
| 7,171,290 B2 | | 1/2007 | Lagadec et al. | |
| 7,246,776 B2 | | 7/2007 | Peck et al. | |
| 7,437,222 B2 | | 10/2008 | Liu et al. | |
| 7,561,947 B2 | | 7/2009 | Bonn et al. | |
| 2003/0188592 A1 | | 10/2003 | Hyde et al. | |
| 2004/0118231 A1 | | 6/2004 | Peck | |
| 2007/0252044 A1 | | 11/2007 | Jackson et al. | |
| 2009/0039202 A1 | | 2/2009 | Ogo et al. | |

FOREIGN PATENT DOCUMENTS

EP 0569205 A1 11/1993

OTHER PUBLICATIONS

EP Search Report, EP 11165584.1-2422 dated Jul. 27, 2011.
EP Communication, EP 11165584.1-2422 dated Aug. 4, 2011.

* cited by examiner

*Primary Examiner* — Yonel Beaulieu
(74) *Attorney, Agent, or Firm* — Ingrassia Fisher & Lorenz, P.C.

(57) ABSTRACT

Methods and systems are provided for reducing angular velocity of a vehicle using a gyroscope array. A method comprises dithering a gyroscope of the gyroscope array, obtaining current through a gimbal motor of the gyroscope while dithering the gyroscope, determining a gimbal rate command to reduce angular velocity of the vehicle based on the current through the gimbal motor obtained while dithering the gyroscope, and operating the gimbal motor of the gyroscope based on the gimbal rate command.

20 Claims, 3 Drawing Sheets ns for reducing angular velocity using a gyroscope array

TECHNICAL FIELD

The subject matter described herein relates generally to spacecraft attitude control systems, and more particularly, embodiments of the subject matter relate to methods and systems for reducing the angular velocity of an agile vehicle using a gyroscope array.

BACKGROUND

Gyroscopes are currently used in a number of military and civilian applications. One common application involves using gyroscopes, known as control moment gyroscopes (CMGs), to control the attitude (or orientation) of a spacecraft, satellite, or another agile vehicle. A CMG comprises a spinning rotor and one or more motorized gimbals, which are used to rotate the axis of rotation of the rotor (e.g., gimballing), which in turn alters the direction of the angular momentum vector of the rotor. This change in angular momentum produces a reactionary torque which causes the spacecraft to rotate to the desired attitude or orientation. Attitude control systems (ACSs) and other spacecraft orienting applications often utilize a momentum control system (MCS) that includes at least three CMGs, also known as a CMG array.

During operation of the agile vehicle, it may be desirable to cease rotation or otherwise reduce angular velocity of the agile vehicle. For example, in response to an interruption or loss of communication between an ACS and the MCS, ceasing rotation of the agile vehicle can prevent the agile vehicle from being oriented at an undesirable attitude. One way to reduce angular velocity and cease rotation of an agile vehicle involves locking the gimbals of the CMGs and utilizing other actuators onboard the agile vehicle to stop the agile vehicle's rotation. However, this approach depletes resources onboard the agile vehicle (e.g., fuel or electrical power) and may also suffer from a relatively long response time. Another approach involves unlocking the gimbals of the CMGs and allowing them to rotate freely. Angular momentum from the agile vehicle is absorbed by the CMG array until the angular velocity of the agile vehicle reaches zero, or the CMG array saturates. However, this approach requires gimbal motors that are capable of being backdriven.

BRIEF SUMMARY

A method is provided for controlling angular velocity of a vehicle using a gyroscope array onboard the vehicle. The method comprises dithering a gyroscope of the gyroscope array, obtaining current through a gimbal motor of the gyroscope while dithering the gyroscope, determining a gimbal rate command to reduce angular velocity of the vehicle based on the current through the gimbal motor obtained while dithering the gyroscope, and operating the gimbal motor of the gyroscope based on the gimbal rate command.

In another embodiment, a control system for an agile vehicle is provided. The control system comprises a control moment gyroscope (CMG) array comprising a plurality of CMGs onboard the agile vehicle, a plurality of current sensors, and a control module coupled to the CMG array and the plurality of current sensors. Each current sensor is configured to measure current through a gimbal motor of a respective CMG of the plurality of CMGs. In response to a triggering event, the control module is configured to dither the plurality of CMGs, obtain gimbal motor currents for the plurality of CMGs while dithering the plurality of CMGs, determine an estimated angular velocity of the agile vehicle based on the gimbal motor currents, determine a torque command to reduce angular momentum of the agile vehicle based on the estimated angular velocity of the agile vehicle, and operate the CMG array based at least in part on the torque command.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit embodiments of the subject matter or the application and uses of such embodiments. Any implementation described herein as exemplary is not necessarily to be construed as preferred or advantageous over other implementations. Furthermore, there is no intention to be bound by any theory presented in the preceding background or the following detailed description.

Technologies and concepts discussed herein relate generally to methods and systems for reducing the angular velocity of an agile vehicle using an array of control moment gyroscopes (CMGs) (alternatively referred to herein as a CMG array). Various implementation aspects of CMG-based attitude control are well known and so, in the interest of brevity, many conventional techniques will only be mentioned briefly herein or will be omitted entirely without providing the well known details. Although the subject matter may be described herein in the context of an agile vehicle, such as a satellite, various aspects of the subject matter may be implemented in other spacecraft or in other applications that utilize CMGs, and the subject matter is not intended to be limited to use with any particular vehicle.

As described in greater detail below, in an exemplary embodiment, each CMG includes a transmission assembly interposed between its gimbal and its corresponding gimbal motor to provide a mechanical advantage, such that the CMGs of the CMG array cannot be readily backdriven. Because the CMGs cannot be readily backdriven, unlocking the gimbals of the CMGs and allowing them to rotate freely to reduce the angular velocity of the agile vehicle is ineffective. In response to a triggering event, such as a deceleration event, one or more CMGs of the CMG array are dithered and the angular momentum of the agile vehicle is determined based on gimbal motor currents obtained while dithering the CMGs. As described in greater detail below, a deceleration event should be understood as referring to a condition wherein it is desirable to cease rotation of the agile vehicle or otherwise reduce the angular velocity of the agile vehicle. After the magnitude and direction of the vehicle momentum are determined from the gimbal motor currents, deceleration commands (e.g., torque commands and/or gimbal rate commands) are utilized to operate the CMGs of the CMG array in a manner that reduces the angular velocity of the agile vehicle. Dithering commands are combined with (or superimposed over) the deceleration commands, and the vehicle angular velocity and corresponding deceleration commands are dynamically determined as the angular velocity of the vehicle is reduced.

Figure 1:
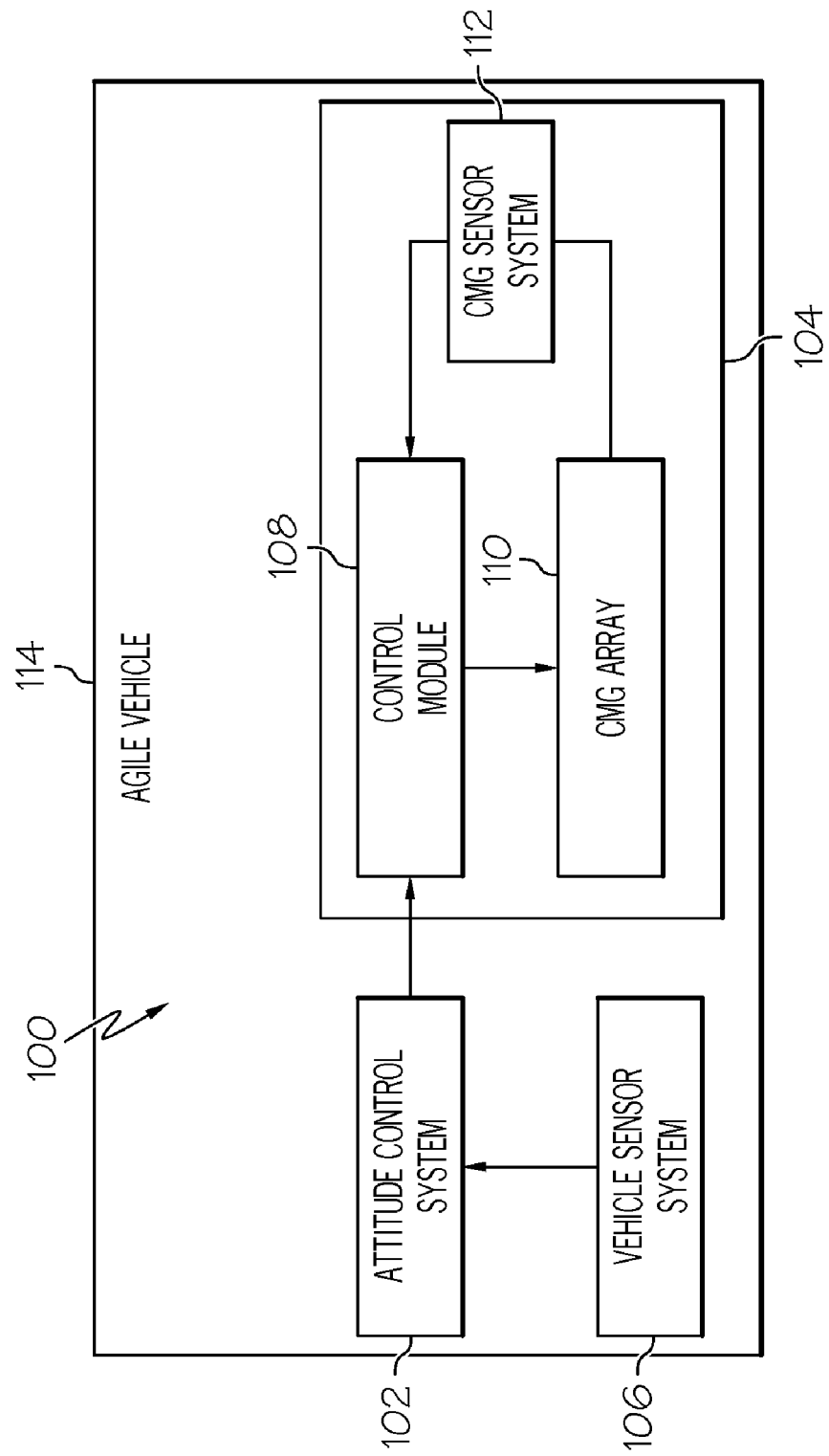
FIG. 1 is a block diagram of a control system suitable for use with an agile vehicle in accordance with one embodiment.

FIG. 1 depicts an exemplary embodiment of a control system 100 suitable for use with an agile vehicle 114, such as a satellite or other spacecraft. In an exemplary embodiment, the control system 100 includes, without limitation, an attitude control system (ACS) 102, a momentum control system (MCS) 104, and a vehicle sensor system 106. During operation of control system 100, the ACS 102 provides torque commands for adjusting the attitude or otherwise reorienting the agile vehicle 114 to a control module 108 of the MCS 104, which, in turn, operates a control moment gyroscope (CMG) array 110 in a manner that is influenced by the torque commands provided by the ACS 102 to reorient the agile vehicle 114.

It should be understood that FIG. 1 is a simplified representation of an agile vehicle 114 for purposes of explanation and ease of description, and FIG. 1 is not intended to limit the application or scope of the subject matter in any way. In this regard, although FIG. 1 depicts the ACS 102 onboard the agile vehicle 114, in some embodiments, some components of the ACS 102 may be separate from the agile vehicle 114 and remotely located (e.g., at a terrestrial location on the Earth) and communicatively coupled to the MCS 104 and vehicle sensor system 106 onboard the agile vehicle 114, for example, via a wireless data link or another suitable wireless data communication medium. In practice, the agile vehicle 114 may also include numerous other components for providing additional functions and features, as will be appreciated in the art.

In an exemplary embodiment, the vehicle sensor system 106 comprises one or more sensing elements (or sensors) configured to sense, measure, or otherwise obtain information regarding the current attitude (or orientation) and rotational velocity (or angular velocity or rotational rate) of the agile vehicle 114. In certain deployments, the vehicle sensor system 106 uses sensors or sensing elements such as, without limitation: rate gyroscopes, ring laser gyros, fiber optic gyros, star trackers and sun sensors. In an exemplary embodiment, the ACS 102 is communicatively coupled to the vehicle sensor system 106, and the ACS 102 determines a torque command for slewing, reorienting, or otherwise adjusting the attitude of the agile vehicle 114 based at least in part on the attitude and rotational velocity information received from the vehicle sensor system 106. Depending on the embodiment, the ACS 102 may determine the torque command automatically based on the current attitude and/or rotational velocity of the agile vehicle 114 or in response to an input from a user.

During operation of control system 100, the MCS 104 communicates with the ACS 102, and in response to receiving a torque command from the ACS 102, the MCS 104 operates the CMGs of the CMG array 110 to adjust the attitude of the agile vehicle 114 based on the torque command and one or more steering control laws utilized to operate the CMG array 110. The control module 108 generally represents the hardware, software, firmware, processing logic, and/or other components of the MCS 104 configured to support operation of the CMG array 110 in response to a torque command. The control module 108 may be implemented or realized with a general purpose processor, a content addressable memory, an application specific integrated circuit, a field programmable gate array, any suitable programmable logic device, discrete gate or transistor logic, discrete hardware components, or any combination thereof, designed to perform the functions described herein. In this regard, the control module 108 may be realized as a microprocessor, a controller, a microcontroller, a state machine, or the like. The control module 108 may also be implemented as a combination of computing devices, e.g., a plurality of processing cores, or any other such configuration. In practice, control module 108 includes processing logic that may be configured to carry out the functions, techniques, and processing tasks associated with the operation of the agile vehicle 114, as described in greater detail below. Furthermore, the steps of a method or algorithm described in connection with the embodiments disclosed herein may be embodied directly in hardware, in firmware, in a software module executed by control module 108, or in any practical combination thereof. In an exemplary embodiment, the control module 108 may also include a suitable amount of memory to support the operations of the control module 108 described herein.

Based on the torque command from the ACS 102, the control module 108 calculates or otherwise determines the appropriate gimbal rate (e.g., the rate of rotation a gimbal about the gimbal axis) for each respective CMG of the CMG array 110 to provide the commanded torque. The control module 108 preferably determines the gimbal rate commands for the CMGs (e.g., commanded rates of rotation of the gimbals of the CMGs) using one or more steering control laws intended to prevent conditions that lead to singularity and/or saturation of the CMG array 110. As used herein, a steering control law should be understood as referring to a control scheme and/or algorithm for determining gimbal rate commands for the CMGs of the CMG array 110 to produce a commanded torque while preventing conditions within the CMG array 110 that may lead to singularity and/or saturation. Various steering control laws are well known and will vary depending on the particular embodiment, and therefore, the specific methods for determining gimbal rate commands for the individual CMGs of the CMG array 110 will not be described in detail herein. The steering control law implemented by the control module 108 may provide a complex and non-linear three-dimensional momentum boundary which limits the total angular momentum of the CMG array 110 based on the direction of the total angular momentum (alternatively referred to herein as the momentum direction) to prevent singularities and/or saturation of the CMG array 110.

In an exemplary embodiment, the MCS 104 includes a CMG sensor system 112 that is coupled to the CMG array 110 and the control module 108. The CMG sensor system 112 is configured to provide information about the operation of individual CMGs within the CMG array 110 to the control module 108. For example, the CMG sensor system 112 may include one or more sensors configured to provide information concerning the state of the respective CMGs of the CMG array 110, such as, for example, the angular position of the gimbal (or gimbal angle), the rotational rate of the gimbal (or gimbal rate), and the spin speed of the rotor, in order to support operation of the steering control laws being utilized by the MCS 104 and/or control module 108. In an exemplary embodiment, the CMG sensor system 112 includes a plurality of current sensors configured to measure, sense, or otherwise obtain the current flowing to/from the gimbal motor of each CMG of the CMG array 110 as described in greater detail below.

In an exemplary embodiment, the CMG array 110 includes a plurality of CMGs, wherein each CMG of the CMG array 110 comprises a rotating element or rotor mounted to a gimbal assembly, which in turn is mounted to the agile vehicle 114. As described in greater detail below in the context of FIG. 2, the rotor (e.g., a wheel or disc) is configured to rotate about a spin axis, which in turn can be tilted or rotated by rotating a gimbal about a gimbal axis. The motion or rotation of the gimbal produces a gyroscopic torque which is orthogonal to the spin axis and the gimbal axis. The gyroscopic torque is imparted or transferred to the agile vehicle 114 and causes a change in the angular velocity of the agile vehicle 114, based on the conservation of angular momentum principles, as will be appreciated in the art. In this regard, the kinetic angular momentum of the CMG array 110 and the angular momentum of the agile vehicle 114 are substantially equal but in opposing directions. Depending on the embodiment, the CMG array 110 may comprise any suitable CMG array geometry known in the art, such as a pyramid array, a roof array (e.g., a plurality of collinear sets of CMGs), a box array, or another suitable CMG array geometry. In an exemplary embodiment, one or more CMGs of the CMG array 110 are not capable of being readily backdriven. For example, as set forth above and described in greater detail below, one or more CMGs of the CMG array 110 may include a transmission assembly interposed between its gimbal motor and its corresponding gimbal to provide a mechanical advantage from the gimbal motor to the CMG gimbal, such that the respective CMG of the CMG array cannot be readily backdriven.

Figure 2:
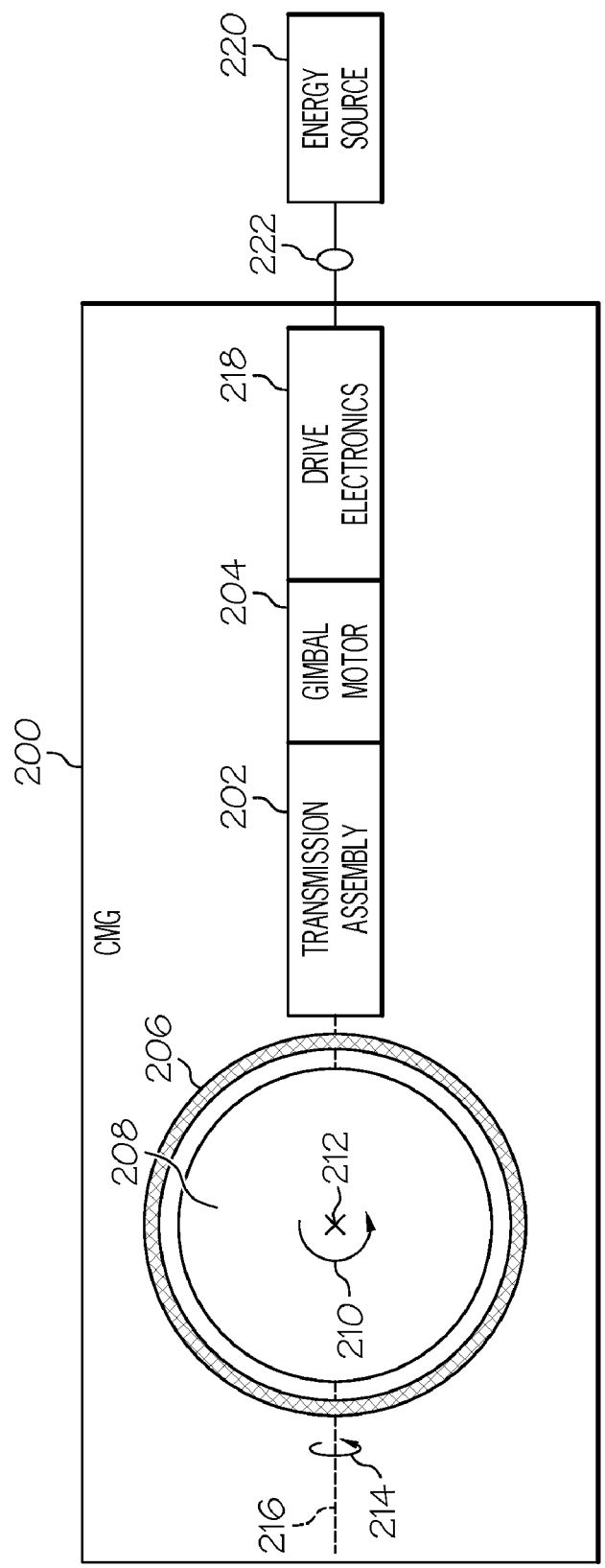
FIG. 2 is a block diagram of a control moment gyroscope suitable for use in the control system of FIG. 1 in accordance with one embodiment.

FIG. 2 depicts an exemplary embodiment of a CMG 200 suitable for use in the CMG array 110 of control system 100. The illustrated embodiment of the CMG 200 includes a transmission assembly 202 coupled to the output of its gimbal motor 204 and interposed between the gimbal motor 204 and its gimbal 206 to provide a mechanical advantage from the gimbal motor 204 to the gimbal 206 such that the gimbal motor 204 cannot be backdriven by the gimbal 206. The transmission assembly 202 may be realized as one or more gears, harmonic drives, traction drives, or other means for facilitating efficient transfer of energy from the gimbal motor 204 to the gimbal 206. As described above, the CMG 200 includes a rotor 208 configured to rotate (or spin) in a direction (indicated by arrow 210) about a spin axis 212, which in turn can be tilted or rotated by rotating the gimbal 206 in a direction (indicated by arrow 214) about gimbal axis 216 to change the angular momentum vector of the rotor 208 and produce a gyroscopic torque.

In an exemplary embodiment, the CMG 200 includes drive electronics 218 interposed between the gimbal motor 204 and an energy source 220 (e.g., a battery, fuel cell, or the like onboard agile vehicle 114). The drive electronics 218 represent the hardware, software, firmware, processing logic, and/or other components configured to receive a gimbal rate command (e.g., from control module 108), and in response to the gimbal rate command, operate the gimbal motor 204 to produce a desired torque that causes the gimbal 206 to be rotated about gimbal axis 216 at a rate corresponding to the gimbal rate command, and thereby achieve a desired transfer of angular momentum from/to the CMG 200 from/to an agile vehicle (e.g., agile vehicle 114). In this regard, the drive electronics 218 regulates or otherwise controls the electric current that flows from the energy source 220 to the gimbal motor 204 to produce the desired torque. In some embodiments, the drive electronics 218 may include processing logic configured to carry out the functions, techniques, and processing tasks associated with the operation of the agile vehicle 114, as described in greater detail below. Furthermore, the steps of a method or algorithm described in connection with the embodiments disclosed herein may be embodied directly in hardware, in firmware, in a software module executed by the drive electronics 218. In an exemplary embodiment, a current sensor 222 is configured or otherwise arranged between the energy source 220 and the CMG 200 and/or gimbal motor 204. The current sensor 222 is configured to sense, measure, or otherwise obtain the current flowing through the gimbal motor 204 (alternatively, the gimbal motor current) during operation of the CMG 200, as described in greater detail below.

Figure 3:
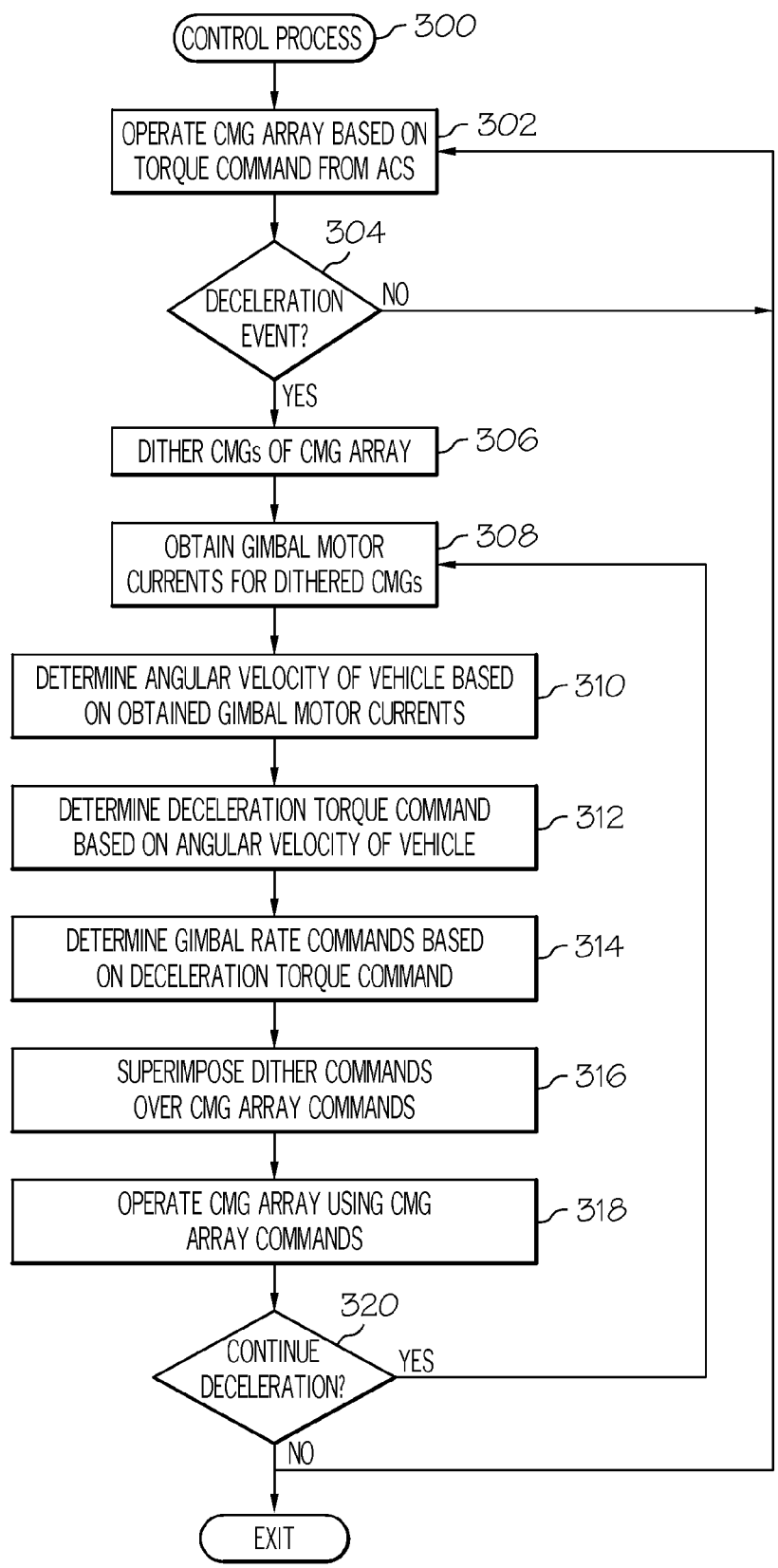
FIG. 3 is a flow diagram of a control process suitable for use with the control system of FIG. 1 in accordance with one embodiment.

Referring now to FIG. 3, in an exemplary embodiment, a control system may be configured to perform a control process 300 and additional tasks, functions, and operations described below. The various tasks may be performed by software, hardware, firmware, or any combination thereof. For illustrative purposes, the following description may refer to elements mentioned above in connection with FIGS. 1-2. In practice, the tasks, functions, and operations may be performed by different elements of the described system, such as the ACS 102, the MCS 104, the control module 108, the CMG array 110, the sensor system 112, the drive electronics 218 and/or the current sensor 222. It should be appreciated that any number of additional or alternative tasks may be included, and may be incorporated into a more comprehensive procedure or process having additional functionality not described in detail herein.

Referring to FIG. 3, and with continued reference to FIG. 1 and FIG. 2, the control process 300 may be performed to decelerate or otherwise reduce the angular velocity of an agile vehicle using a CMG array in response to a triggering event. In an exemplary embodiment, the control process 300 begins by operating the CMG array onboard the agile vehicle based on torque commands received from an ACS (task 302). As described above, the ACS 102 determines a torque command that corresponds to a desired amount of reactionary torque to be provided by the MCS 104 and/or CMG array 110 to reorient or otherwise adjust the attitude of the agile vehicle 114 in a commanded direction to achieve a desired attitude and/or rotational velocity of the agile vehicle 114. In response to receiving the torque command from the ACS 102, the MCS 104 and/or control module 108 determines gimbal rate commands for the CMGs of the CMG array based on the torque command and one or more steering control laws for the CMG array. As described above, the steering control laws are utilized by the MCS 104 and/or control module 108 to determine how the individual CMGs should be rotated to produce the commanded torque without causing singularities or saturation in the CMG array 110. In an exemplary embodiment, the control module 108 applies one or more steering control laws to the torque command from the ACS 102 to determine gimbal rate commands for the individual CMGs of the CMG array 110 that result in the CMGs of the CMG array 110 being rotated in a manner that produces the commanded torque (or as close to the commanded torque as reasonably practical without causing saturation and/or singularities) and in the desired direction. The control module 108 provides the gimbal rate commands to the drive electronics 218 of the respective CMGs 200 of the CMG array 110, wherein the drive electronics 218 operate the gimbal motors 204 of the respective CMGs 200 to produce the commanded rate of rotation of the gimbals 206 about gimbal axis 216.

In an exemplary embodiment, the control process 300 continues by determining or otherwise identifying whether a triggering event has occurred (task 304). As described above, in accordance with one or more embodiments, the triggering event comprises a deceleration event. In this regard, the control process 300 identifies the existence of a condition wherein it is desirable to cease rotation of the agile vehicle 114 or otherwise reduce the angular velocity of the agile vehicle 114. For example, the MCS 104 and/or control module 108 may identify a deceleration event in response to determining or otherwise identifying that communications within the control system 100 have been interrupted or are no longer functioning properly. In accordance with one embodiment, the MCS 104 and/or control module 108 identifies a deceleration event in response to determining or otherwise identifying that communications between the ACS 102 and the MCS 104 have been interrupted or are no longer functioning properly. In this regard, the ACS 102 may provide a new torque command to the MCS 104 at a particular rate (or frequency), wherein the MCS 104 and/or control module 108 may identify a deceleration event when a torque command has not been received from the ACS 102 within the predetermined time. In another embodiment, the MCS 104 and/or control module 108 identifies a deceleration event in response to determining or otherwise identifying that communications between the control module 108 and one or more CMGs of the CMG array 110 have been interrupted or are no longer functioning properly. In the absence of a deceleration event, the control process 300 repeats the loop defined by tasks 302 and 304 to control the attitude of the agile vehicle 114 in accordance with valid torque commands received from the ACS 102.

In response to identifying a deceleration event, the control process 300 continues by dithering one or more CMGs of the CMG array and obtaining the gimbal motor currents for the dithered CMGs of the CMG array (tasks 306, 308). In this regard, in an exemplary embodiment, for each respective CMG of the CMG array 110, the control process 300 operates its gimbal motor to overcome stiction and rotate the gimbal by an equal amount in opposing directions over a time interval (referred to herein as a dithering cycle). Each CMG of the CMG array 110 may be dithered by providing appropriate dithering commands to the drive electronics 218 that cause the drive electronics 218 to operate the gimbal motor 204 in a manner that results in substantially zero net angular displacement of the gimbal 206 over the dithering cycle. For example, for each CMG of the CMG array 110, the control module 108 may dither the respective CMG 200 by providing appropriate dithering commands to the drive electronics 218 that causes the drive electronics 218 to operate the gimbal motor 204 over a first portion of the dithering cycle to rotate the gimbal 206 by a predetermined amount of angular displacement (alternatively referred to herein as the dithering angular displacement) in a first direction (e.g., the direction indicated by arrow 214) about gimbal axis 216 followed by operating the gimbal motor 204 over the remaining portion of the dithering cycle to rotate the gimbal 206 by the dithering angular displacement in the opposite direction (e.g., the direction opposite arrow 214). In an exemplary embodiment, the dithering angular displacement is less than one degree of rotation about the gimbal axis 216. In this manner, the dithering of the CMGs of the CMG array 110 does not change the angular momentum of the CMG array 110, and thus, produces zero net change in the angular momentum of the agile vehicle 114.

In an exemplary embodiment, for each of the dithered CMGs of the CMG array 110, the control process 300 obtains the gimbal motor current during the dithering cycle, that is, the current flowing through the gimbal motor 204 of the respective CMG during the dithering cycle. For example, for each CMG of the CMG array 110, the control module 108 may obtain the current flowing from an energy source onboard the agile vehicle 114 (e.g., energy source 220) to the gimbal motor from the CMG sensor system 112 and/or current sensor 222. The CMG sensor system 112 and/or current sensor 222 measures or otherwise senses the current flowing through the gimbal motor 204 and provides the value to the control module 108. Based on the relationship between the direction of the angular momentum of the agile vehicle 114 and the direction of the angular momentum of a respective CMG of the CMG array 110, the current flowing through the gimbal motor 204 to produce the dithering angular displacement will vary depending upon the direction which the gimbal 206 is being rotated. For example, the gimbal motor current that produces the dithering angular displacement of the gimbal 206 in a first direction (e.g., the direction indicated by arrow 214) about gimbal axis 216 may be greater and/or less than the gimbal motor current that produces the dithering angular displacement of the gimbal 206 in the opposing direction (e.g., the direction opposite arrow 214). In an exemplary embodiment, for each CMG of the CMG array 110, the control module 108 obtains the gimbal motor current during the dithering cycle by averaging the gimbal motor current obtained during the first portion of the dithering cycle (e.g., the time interval during which the gimbal is being rotated in a first direction) and the gimbal motor current during the remaining portion of the dithering cycle (e.g., the time interval during which the gimbal is being rotated in the opposing direction). Averaging the gimbal motor currents over the dithering cycle mitigates gimbal drag nonlinearities that may be exhibited as a result of friction in the gimbal transmission assembly 202.

In an exemplary embodiment, the control process 300 continues by calculating, determining, or otherwise estimating the angular velocity of the agile vehicle based on the gimbal motor currents obtained during the dithering cycle (task 310). In this regard, the control process 300 determines an estimated angular velocity vector for the agile vehicle 114 based on the gimbal motor currents for the CMGs of the CMG array 110 that were obtained during dithering cycle. In an exemplary embodiment, the control process 300 calculates, determines, or otherwise obtains, for each respective CMG of the CMG array 110, the gyroscopic precession torque component at its gimbal axis 216 that is attributable to the angular velocity of the agile vehicle 114 by multiplying the obtained gimbal motor current for its gimbal motor 204 by a constant representative of the mechanical advantage (e.g., the gear ratio) provided by its associated transmission assembly 202 and dividing the result by the torque constant of its gimbal motor 204. The gyroscopic precession torque opposes the torque provided at the output of the transmission assembly 202. The control process 300 continues by calculating, determining, or otherwise obtaining, for each respective CMG of the CMG array 110, the component of the angular velocity of the agile vehicle 114 that would produce the gyroscopic precession torque component by dividing the gyroscopic precession torque component by the angular momentum of the respective CMG (e.g., the product of the inertia of the rotor 208 and the rotational rate or spin speed of the rotor 208 obtained from CMG sensor system 112). In an exemplary embodiment, after determining the angular velocity component that produces the gyroscopic precession torque component for each respective CMG of the CMG array, the angular velocity components corresponding to the respective CMGs are arranged into an n×1 matrix (or array), wherein n is the number of CMGs in the CMG array 110. The control process 300 continues by determining an n×3 transformation matrix for transforming from the reference frame of the agile vehicle 114 to the reference frame of the output axes of the CMGs of the CMG array 110 and multiplying the Moore-Penrose pseudoinverse of the transformation matrix by the n×1 matrix of the angular velocity components that produce the gyroscopic precession torque component for each respective CMG of the CMG array, resulting in a 3×1 matrix corresponding to an estimated angular velocity vector for the agile vehicle 114.

Still referring to FIG. 3, in an exemplary embodiment, after obtaining the estimated angular velocity of the agile vehicle, the control process 300 continues by determining a deceleration torque command to reduce the angular velocity of the agile vehicle based on the estimated angular velocity of the agile vehicle (task 312). In an exemplary embodiment, the control process 300 and/or control module 108 determines a deceleration torque command for the CMG array 110 that opposes the angular velocity of the agile vehicle 114. For example, in accordance with one embodiment, the control process 300 determines the deceleration torque command by multiplying the inertia of the agile vehicle 114 by the estimated angular velocity vector, and then multiplying the result by a negative gain factor. After determining the deceleration torque command, the control process 300 continues by determining deceleration commands for the individual CMGs of the CMG array based on the deceleration torque command (task 314). In this regard, the control process 300 obtains or otherwise determines deceleration gimbal rate commands for the CMGs of the CMG array 110 by applying one or more steering control laws for the CMG array 110 to the deceleration torque command in a similar manner as described above.

In an exemplary embodiment, the control process 300 continues by superimposing or otherwise combining dithering commands for one or more CMGs of the CMG array 110 with the deceleration gimbal rate commands and operating the CMGs of the CMG array in accordance with the deceleration gimbal rate commands having superimposed dithering commands (tasks 316, 318). In this regard, for each respective CMG of the CMG array 110, the deceleration gimbal rate command for that respective CMG is combined with a dithering command for that respective CMG that is configured to operate its gimbal motor to overcome stiction and rotate its gimbal by an equal amount in opposing directions over a dithering cycle, as described above (e.g., task 306). This results in dithered deceleration gimbal rate command for each respective CMG that corresponds to the dithering command superimposed over the deceleration gimbal rate command obtained from the deceleration torque command. The deceleration gimbal rate command component reduces angular velocity of the agile vehicle 114 while the dithering command component contributes substantially zero net change in the angular velocity of the agile vehicle 114.

In an exemplary embodiment, the control process 300 determines or otherwise identifies whether the deceleration of the angular velocity of the agile vehicle should continue (task 320). In this regard, the control process 300 may continue reducing the angular velocity of the agile vehicle 114 in response to a persistent deceleration event. Alternatively, the control process 300 may resume normal operation of the agile vehicle 114 by verifying the condition identified above (e.g., task 304) no longer exists. For example, the control process 300 may identify or otherwise determine that communications between the ACS 102 and the MCS 104 have been restored or are otherwise functioning properly, and resume normal operation of the CMG array 110 based on torque commands received from the ACS 102. Otherwise, the loop defined by tasks 308, 310, 312, 314, 316, 318, and 320 may repeat as desired. In this regard, for a persistent deceleration event, the control process 300 may continually monitor the gimbal motor currents, determine the estimated angular velocity of the agile vehicle 114, and dynamically determine deceleration torque commands to compensate in variations in the angular velocity of the agile vehicle 114. In some embodiments, in response to identifying or otherwise determining that the angular velocity of the agile vehicle 114 is substantially equal to zero (e.g., the agile vehicle 114 is at a substantially constant attitude), the control process 300 exits and ceases operation of the CMG array to conserve resources onboard the agile vehicle 114.

Still referring to FIGS. 1-3, in some embodiments, the control process 300 may be implemented by an individual CMG of the CMG array 110 (e.g., CMG 200). In this regard, the drive electronics 218 operates the CMG 200 and/or gimbal motor 204 in accordance with gimbal rate commands received from the MCS 104 and/or control module 108 (task 302). In response to identifying a deceleration event, such as, for example, a loss of communication between the control module 108 and the drive electronics 218, the drive electronics 218 dither the gimbal 206 as described above (tasks 304, 306). In this embodiment, the drive electronics 218 are coupled to or otherwise in communication with the current sensor 222 and/or CMG sensor system 112 and obtain the current flowing through the gimbal motor 204 as described above (task 308). The drive electronics 218 continues by determining a deceleration gimbal rate command for the CMG 200 based on the obtained gimbal motor current. In this regard, the drive electronics 218 determine or otherwise obtain the gyroscopic precession torque component at the gimbal axis 216 in a similar manner as described above. The drive electronics 218 calculates, determines, or otherwise obtains, for each respective CMG of the CMG array 110, a deceleration gimbal rate command that rotates the respective CMG about its gimbal axis in the direction that the gyroscopic precession torque would have rotated the respective CMG if it were capable of being backdriven. The drive electronics 218 then operates the CMG 200 and/or gimbal motor 204 in accordance with the deceleration gimbal rate command while superimposing or otherwise combining dithering commands for the CMG 200 as described above (tasks 316, 318). In this manner, the drive electronics 218 rotates the gimbal 206 of the CMG 200 about the gimbal axis 216 in the direction that the gyroscopic precession torque component would have rotated the gimbal 206 if the gimbal motor 204 were capable of being backdriven.

To briefly summarize, the methods and systems described above allow for an array of non-backdriveable CMGs to reduce the angular velocity of an agile vehicle based on measured gimbal motor currents. Thus, in the event of an interruption of communication between the MCS and the ACS, the MCS is capable of reducing the angular velocity of the agile vehicle even though the MCS may not have information regarding the current angular velocity of the agile vehicle (e.g., information from onboard vehicle sensors may be available to the ACS but not the MCS). It should be appreciated that although the subject matter may be described herein in the context of CMGs that cannot be readily backdriven, the subject matter may be implemented in a corresponding manner for CMGs that are capable of being backdriven, and the subject matter is not intended to be limited to use with any particular type of CMG.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context.

For the sake of brevity, conventional techniques related to attitude control systems, gyroscope controls, slew planning, satellite and/or spacecraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for controlling angular velocity of a vehicle using a control moment gyroscope (CMG) array including a plurality of control moment gyroscopes (CMGs) onboard the vehicle, the method comprising:
   dithering the plurality of CMGs over a time interval;
   obtaining gimbal motor currents for the plurality of CMGs during the time interval;
   determining an angular velocity of the vehicle based on the gimbal motor currents;
   determining a deceleration torque command for the CMG array based on the angular velocity of the vehicle; and
   operating the CMG array in a manner that is influenced by the deceleration torque command.

2. The method of claim 1, wherein determining the angular velocity comprises, for each CMG of the plurality of CMGs:
   determining a gyroscopic precession torque at the respective CMG; and
   determining a component of the angular velocity of the vehicle based on the gyroscopic precession torque.

3. The method of claim 2, wherein:
   determining the component of the angular velocity of the vehicle for each CMG of the plurality of CMGs results in a plurality of angular velocity components; and
   determining the angular velocity further comprises transforming the plurality of angular velocity components from a reference frame corresponding to output axes of the plurality of CMGs to a reference frame corresponding to the vehicle.

4. The method of claim 3, wherein transforming the plurality of angular velocity components comprises:
   determining a transformation matrix for transformation from the reference frame corresponding to the vehicle to the reference frame corresponding to the output axes of the plurality of CMGs; and
   transforming the plurality of angular velocity components to the reference frame corresponding to the vehicle based on the transformation matrix.

5. The method of claim 3, wherein transforming the plurality of angular velocity components comprises the steps of:
   determining an n×3 transformation matrix for transformation from the reference frame corresponding to the vehicle to the reference frame corresponding to the output axes of the plurality of CMGs; and
   arranging the plurality of angular velocity components into a n×1 matrix; and
   multiplying a Moore-Penrose pseudoinverse of the n×3 transformation matrix by the n×1 matrix of angular velocity components to obtain an estimated angular velocity vector.

6. The method of claim 1, wherein determining the deceleration torque command comprises:
   determining angular momentum of the vehicle based on the angular velocity and an inertia of the vehicle; and
   determining a torque command that opposes angular momentum of the vehicle.

7. The method of claim 1, wherein dithering the plurality of CMGs comprises, for each CMG of the plurality of CMGs:
   rotating a gimbal of the respective CMG by a first angular displacement in a first direction during a first portion of the time interval; and
   rotating the gimbal by the first angular displacement in a second direction over a second portion of the time interval, the second direction being opposite the first direction.

8. The method of claim 7, wherein obtaining gimbal motor currents for the plurality of CMGs comprises, for each CMG of the plurality of CMGs:
   obtaining a first current through a gimbal motor of the respective CMG while rotating the gimbal in the first direction;
   obtaining a second current through the gimbal motor while rotating the gimbal in the second direction; and
   averaging the first current and the second current.

9. The method of claim 1, wherein operating the CMG array based on the deceleration torque command comprises, for each CMG of the plurality of CMGs:
   determining a deceleration gimbal rate command for the respective CMG based on the deceleration torque command;
   superimposing a dithering command over the deceleration gimbal rate command, resulting in a dithered deceleration gimbal rate command for the respective CMG; and
   operating a gimbal motor of the respective CMG based on the dithered deceleration gimbal rate command.

10. A control system for an agile vehicle, the control system comprising:
    a control moment gyroscope (CMG) array comprising a plurality of CMGs onboard the agile vehicle;

a plurality of current sensors, each current sensor being configured to measure current through a gimbal motor of a respective CMG of the plurality of CMGs; and a control module coupled to the CMG array and the plurality of current sensors, wherein in response to a triggering event, the control module is configured to:

dither the plurality of CMGs;

obtain gimbal motor currents for the plurality of CMGs while dithering the plurality of CMGs;

determine an estimated angular velocity of the agile vehicle based on the gimbal motor currents;

determine a torque command to reduce angular momentum of the agile vehicle based on the estimated angular velocity of the agile vehicle; and operate the CMG array based at least in part on the torque command.

11. The control system of claim 10, wherein each CMG of the plurality of CMGs includes a transmission assembly coupled to the output of its gimbal motor.

12. The control system of claim 11, wherein the control module is configured to determine the estimated angular velocity by:

determining a gyroscopic precession torque at the output of the transmission assembly of each CMG of the plurality of CMGs, resulting in a plurality of gyroscopic precession torques; and determining angular velocity components based on the plurality of gyroscopic precession torques.

13. The control system of claim 12, wherein the control module is configured to determine the gyroscopic precession torque at the output of the transmission assembly of a respective CMG of the plurality of CMGs by multiplying the obtained gimbal motor current for the respective CMG by a gear ratio of the transmission assembly of the respective CMG divided by a torque constant of the gimbal motor of the respective CMG.

14. The control system of claim 12, wherein the control module is configured to transform the angular velocity components from a reference frame corresponding to the output axes of the plurality of CMGs to a reference frame corresponding to the agile vehicle to determine the estimated angular velocity.

15. The control system of claim 10, further comprising an attitude control system (ACS) communicatively coupled to the control module, the ACS being configured to provide torque commands for reorienting the agile vehicle, wherein the control module is configured to identify the triggering event in response to an interruption of communication between the ACS and the control module.

16. A method for controlling angular velocity of a vehicle using a gyroscope array onboard the vehicle, the method comprising:

dithering a gyroscope of the gyroscope array;

obtaining current through a gimbal motor of the gyroscope while dithering the gyroscope;

determining a gimbal rate command to reduce angular velocity of the vehicle based on the current through the gimbal motor obtained while dithering the gyroscope; and operating the gimbal motor of the gyroscope based on the gimbal rate command.

17. The method of claim 16, the gyroscope including a gimbal having a gimbal axis, wherein determining the gimbal rate command comprises:

determining a gyroscopic precession torque component at the gimbal axis based on the current through the gimbal motor obtained while dithering the gyroscope; and determining the gimbal rate command based on the gyroscopic precession torque component.

18. The method of claim 17, wherein operating the gimbal motor of the gyroscope based on the gimbal rate command comprises rotating the gimbal about the gimbal axis in a direction that the gyroscopic precession torque component would have rotated the gimbal if the gimbal motor were capable of being backdriven.

19. The method of claim 16, wherein dithering the gyroscope comprises:

rotating a gimbal of the gyroscope by a first angular displacement in a first direction; and rotating the gimbal by the first angular displacement in a second direction, the second direction being opposite the first direction.

20. The method of claim 19, wherein obtaining current through the gimbal motor comprises:

obtaining a first current through the gimbal motor while rotating the gimbal in the first direction;

obtaining a second current through the gimbal motor while rotating the gimbal in the second direction; and averaging the first current and the second current.

* * * * *